US010605225B2

(12) United States Patent
St-Laurent et al.

(10) Patent No.: US 10,605,225 B2
(45) Date of Patent: Mar. 31, 2020

(54) CONTROL SYSTEM FOR SUBMERSIBLE ELECTRIC MOTOR DRIVE CONTROL

(71) Applicant: FRANKLIN EMPIRE, Montreal (CA)

(72) Inventors: Daniel St-Laurent, Longueuil (CA); Thomas Ferland, Varennes (CA); Samuel Bouchard, Montreal (CA); Denis Otth, Longueuil (CA); Donat Picron, Brussels (BE)

(*) Notice: Subject to any disclaimer, the term of this patent is extended or adjusted under 35 U.S.C. 154(b) by 192 days.

(21) Appl. No.: 15/559,112

(22) PCT Filed: Mar. 21, 2016

(86) PCT No.: PCT/CA2016/050319
§ 371 (c)(1),
(2) Date: Sep. 18, 2017

(87) PCT Pub. No.: WO2016/145541
PCT Pub. Date: Sep. 22, 2016

(65) Prior Publication Data
US 2018/0245565 A1 Aug. 30, 2018

Related U.S. Application Data

(60) Provisional application No. 62/135,327, filed on Mar. 19, 2015.

(51) Int. Cl.
F03B 15/08 (2006.01)
F03B 3/18 (2006.01)
(Continued)

(52) U.S. Cl.
CPC ............ F03B 15/08 (2013.01); F03B 3/183 (2013.01); F03B 15/04 (2013.01); F03B 15/16 (2013.01);
(Continued)

(58) Field of Classification Search
CPC .......... F03B 15/08; F03B 15/04; F03B 3/183; F05B 2270/602; F05B 2270/604
See application file for complete search history.

(56) References Cited

U.S. PATENT DOCUMENTS 3,960,463 A 6/1976 Okada et al.
4,625,125 A * 11/1986 Kuwabara ............... F03B 15/06
290/52

(Continued)

FOREIGN PATENT DOCUMENTS

CN 35101368 A 1/1987
CN 1049396 A 2/1991
(Continued)

Primary Examiner — Moshe Wilensky
Assistant Examiner — Topaz L. Elliott
(74) Attorney, Agent, or Firm — Benoit & Côté Inc.; Ibrahim Tamer

(57) ABSTRACT

System and method for controlling operation of a hydro-electric production system comprising electrical actuators operably connected at opposite positions of a gate operating ring for rotating the wicket gates to a desired position. The system receives a single control signal designed for a hydraulic system comprising hydraulic actuators operably connected to a single fluid reservoir and configured to work in tandem to produce simultaneous and opposite axial movements. The system comprises a control interface adapted to produce new control signals, each new signal being intended to a different electrical actuator to cause the electrical actuators to have axial movements which are identical in speed and in opposite directions to substantially imitate the exact movement of the hydraulic actuators onto the gate operating ring. The system is configured to introduce a dampening effect to reduce sudden acceleration and deceleration which is purposely used in hydraulic systems to overcome friction and static effects.

20 Claims, 9 Drawing Sheets

(51) Int. Cl.
*F03B 15/16* (2006.01)
*F03B 15/04* (2006.01)
*H02P 9/00* (2006.01)

(52) U.S. Cl.
CPC .......... *H02P 9/006* (2013.01); *F05B 2220/32* (2013.01); *F05B 2260/845* (2013.01); *F05B 2270/107* (2013.01); *F05B 2270/602* (2013.01); *F05B 2270/604* (2013.01); *Y02E 10/223* (2013.01); *Y02E 10/226* (2013.01); *Y02P 70/525* (2015.11)

(56) References Cited

U.S. PATENT DOCUMENTS

| | | | |
|---|---|---|---|
| 5,160,244 A * | 11/1992 | Kuwabara | F04D 15/00 |
| | | | 290/52 |
| 9,494,173 B2 * | 11/2016 | Pavillet | F03B 3/183 |
| 2004/0101401 A1 | 5/2004 | Gerler | |
| 2010/0194216 A1 | 8/2010 | Davis | |
| 2017/0030324 A1 * | 2/2017 | St-Laurent | F03B 3/18 |

FOREIGN PATENT DOCUMENTS

| | | | | |
|---|---|---|---|---|
| CN | 102725514 A | 10/2012 | | |
| CN | 202611985 U | 12/2012 | | |
| FR | 2300230 A1 * | 9/1976 | | F03B 3/183 |
| JP | 05087038 A | 4/1993 | | |
| JP | 09203373 A | 8/1997 | | |
| JP | 10073071 A | 3/1998 | | |
| JP | 2002349410 A | 12/2002 | | |

\* cited by examiner

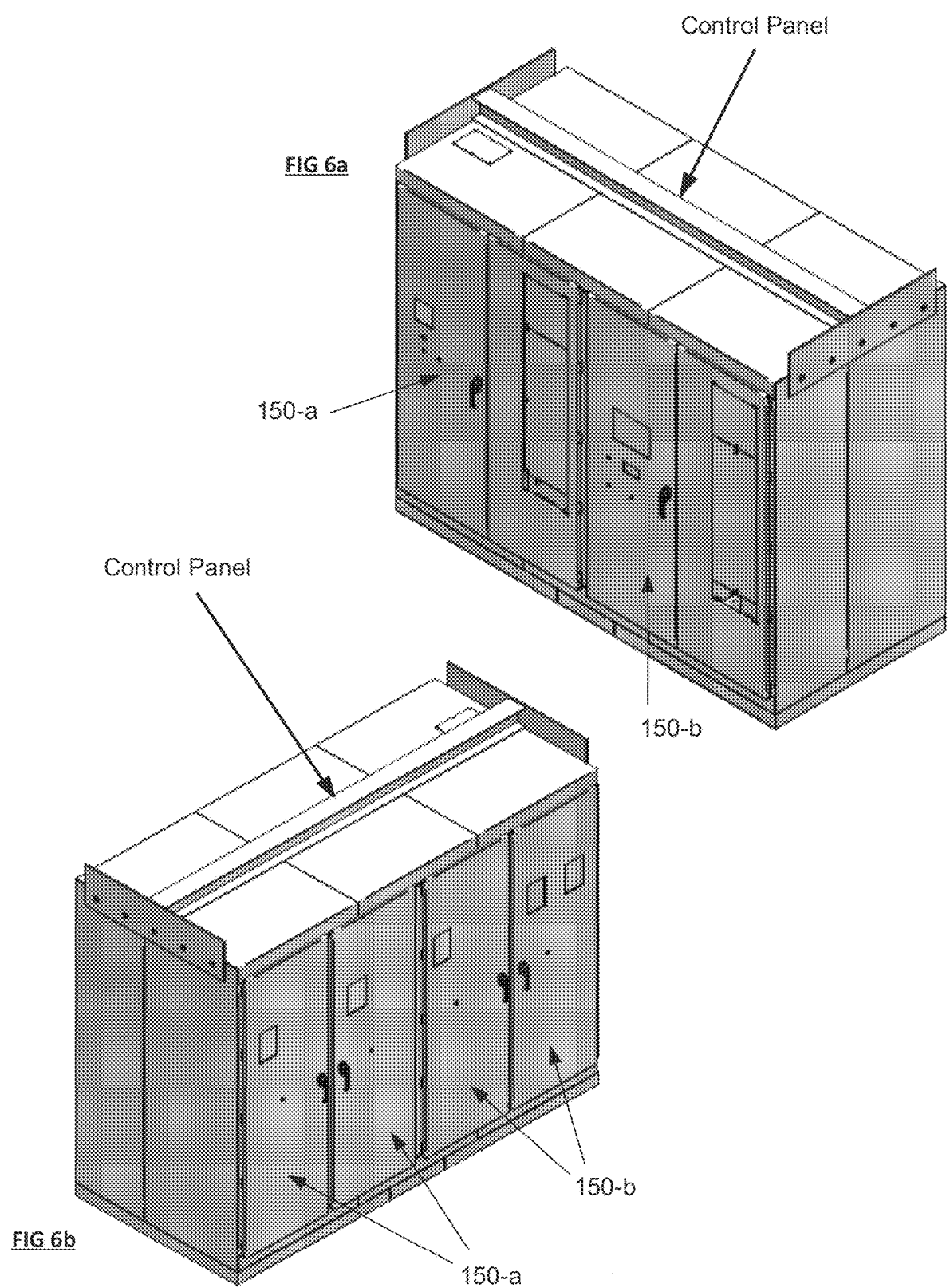

CONTROL SYSTEM FOR SUBMERSIBLE ELECTRIC MOTOR DRIVE CONTROL

CROSS-REFERENCE TO RELATED APPLICATIONS

This application claims priority of U.S. provisional patent application No. 62/135,327 filed on Mar. 19, 2015 the specification of which is hereby incorporated by reference.

BACKGROUND (a) Field

The subject matter disclosed generally relates to water turbines.

(b) Related Prior Art

Conventional turbines used to regulate water flow in hydro-electric production are being controlled using oil-based hydraulic motors to open and close the turbine blades. These hydraulic systems include contaminants such as hydraulic oil in the pressurized lines, pumps and reservoirs required to sustain the system's operation. These contaminants are present in large quantities and may reach up to 30,000 liters in an average dam.

The major disadvantage associated with this type of motors is the leakage of contaminants such as hydraulic oil into the water.

Excessive oil leakage occurs during normal operations for example during maintenance, or in normal operations due to the age of the system (some systems have been in operation for over 75 years). When the leakage occurs, the oil is released into the environment, polluting the river source.

In addition, major system failures (caused by river debris passing through upstream filtering, irregular water flow or mechanical failure in the system) can cause a major backflow of pressure, thereby submersing the entire turbine and turbine flow control system, and releasing significant amounts of oil from the hydraulic system into the river causing severe environmental damage.

Therefore, there remains a need for a hydro-electric production system which is environment friendly and at the same time submersible to replace the existing systems.

SUMMARY

Co-invented and co-owned International Patent Application No. PCT/CA2015/000253 (which is incorporated herein by reference in its entirety) describes a submersible oil free hydro-electric production system which replaces the existing hydraulic actuators which work pistons by electrical actuators which open and close the gate operating ring of the turbine by rotating one electrical actuator clockwise and the other one counterclockwise simultaneously using a screw threads/gear assembly.

However, when upgrading control systems in existing dams having turbines that are controlled using hydraulic systems, there exists an obligation to control the electrical actuators of the oil-free system using the existing control signal which is sent to the hydraulic system of each turbine. This control signal is sent from a central control system at the hydro-electric facility for controlling each turbine as required based on electrical grid loading requirements, river source water levels, and other factors.

The obligation to adapt and use the existing control signal is due to several factors including but not limited to:

Testing: when the new submersible oil free system is to be tested, an existing oil-based hydraulic control system is removed to be replaced by the oil free hydro-electric production system discussed above. Therefore, it is imperative that the new system be compatible with the existing control signals especially that such control relies on the response of several turbines in the dam at the same time in order to control the production of electricity.

Constant demand for electricity and constant flow of water through the river/dam: another factor that dictates the need to adapt and use existing control systems is that it is impossible to remove all oil-based hydraulic control systems from the dam due to the continuous demand for electricity and the continuous flow of water in the river/dam. Therefore, the control systems associated with each turbine need to be replaced one by one while the other turbines in the dam are functioning.

Other factors: Many other factors exist which dictate the use of the existing control signals including but not limited to, the costs associated with changing the entire electricity production control systems and central control systems etc.

In one aspect, there is provided a system for controlling operation of an electrical actuator system of a hydro-electric turbine in a hydraulic control environment in which control signals are generated for hydraulic actuators, the electrical actuator system comprising a first and a second electrical actuators operably connected at opposite positions to a gate operating ring, the system comprising: a control interface configured to receive a hydraulic control signal and process the hydraulic control signal to generate a first control signal for controlling movement of the first electrical actuator, and a second control signal for controlling movement of the second electrical actuator; wherein the first and second control signals cause the first and second electrical actuators to have axial movements which are identical in speed and opposite in directions for rotating the gate operating ring to a desired position, thereby, imitating movement of the hydraulic actuators.

In another aspect, there is provided a method for retrofitting an electrical actuator system of a hydro-electric turbine in a hydraulic control environment, the electrical actuator system comprising a first and a second electrical actuators operably connected at opposite positions to a gate operating ring, the method comprising: receiving and processing a single hydraulic control signal designated for a hydraulic actuator; generating, based on the received hydraulic control signal, a first control signal for controlling movement of the first electrical actuator, and a second control signal for controlling movement of the second electrical actuator; and the first and second control signals causing the first and second electrical actuators to have axial movements which are identical in speed and opposite in directions for rotating the gate operating ring to a desired position.

In a further aspect, there is provided a system for retrofitting an electrical actuator system of a hydro-electric turbine in a hydraulic control environment, the system comprising: a control interface configured to receive a hydraulic control signal generated for hydraulic actuators and process the hydraulic control signal to generate a first control signal for controlling movement of a first electrical actuator, and a second control signal for controlling movement of a second electrical actuator; the first and a second electrical actuators being operably connected at opposite positions to a gate operating ring which is connected to rotating wicket gates of the turbine. The first and second control signals causing the first and second electrical actuators to have axial movements which are identical in speed and opposite in directions for rotating the gate operating ring to a desired position, thereby, substantially imitating an exact movement of the hydraulic actuators in response to the hydraulic control signal.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 6a is a front perspective view of a EDMCS in accordance with an embodiment;

FIG. 6b is a rear view of the EDMCS of FIG. 6a; and

It will be noted that throughout the appended drawings, like features are identified by like reference numerals.

DETAILED DESCRIPTION

The embodiments describe a system and method for retrofitting an electrical actuator system in hydroelectric production system controlled using a hydraulic control environment. The system being configured to operate a hydro-electric production system comprising electrical actuators operably connected at opposite positions of a gate operating ring for rotating the wicket gates to a desired position. The system receives a single control signal designed for a hydraulic system comprising hydraulic actuators. The hydraulic actuators being operably connected to a single fluid reservoir and configured to produce simultaneous and opposite axial movements. The system is configured to process the single control signal to produce new control signals, each new signal being intended to a different electrical actuator to cause the electrical actuators to rotate at the same speed and in opposite directions to substantially imitate the exact movement of the hydraulic actuators onto the gate operating ring e.g. causing substantially the same opening/closing of the wicket gates. The system is configured to modify the signal to protect the gears by introducing a dampening effect intended to reduce sudden acceleration and deceleration which is purposely used in hydraulic systems to overcome friction and static effects and to increase responsivity. A fail safe mechanism is also described to ensure proper operation of the different components during normal operations and in cases of emergencies.

As discussed above, co-invented and co-owned International Patent Application No. PCT/CA2015/000253 describes a submersible electric motor drive actuator to control turbine operation at a hydro-electric generating facility. The electric motor drive actuator replaces existing hydraulic actuators in order to prevent oil leakage in the river supply in the event of extraordinary operating circumstances. In an embodiment, the electric motor drive actuator includes two actuators, one on each side of the gate operating ring of the turbine in upstream and downstream positions. The two actuators must work in tandem to perform their regular functions. Examples are illustrated below with respect to FIGS. 1a & 1b.

Figure 1A:
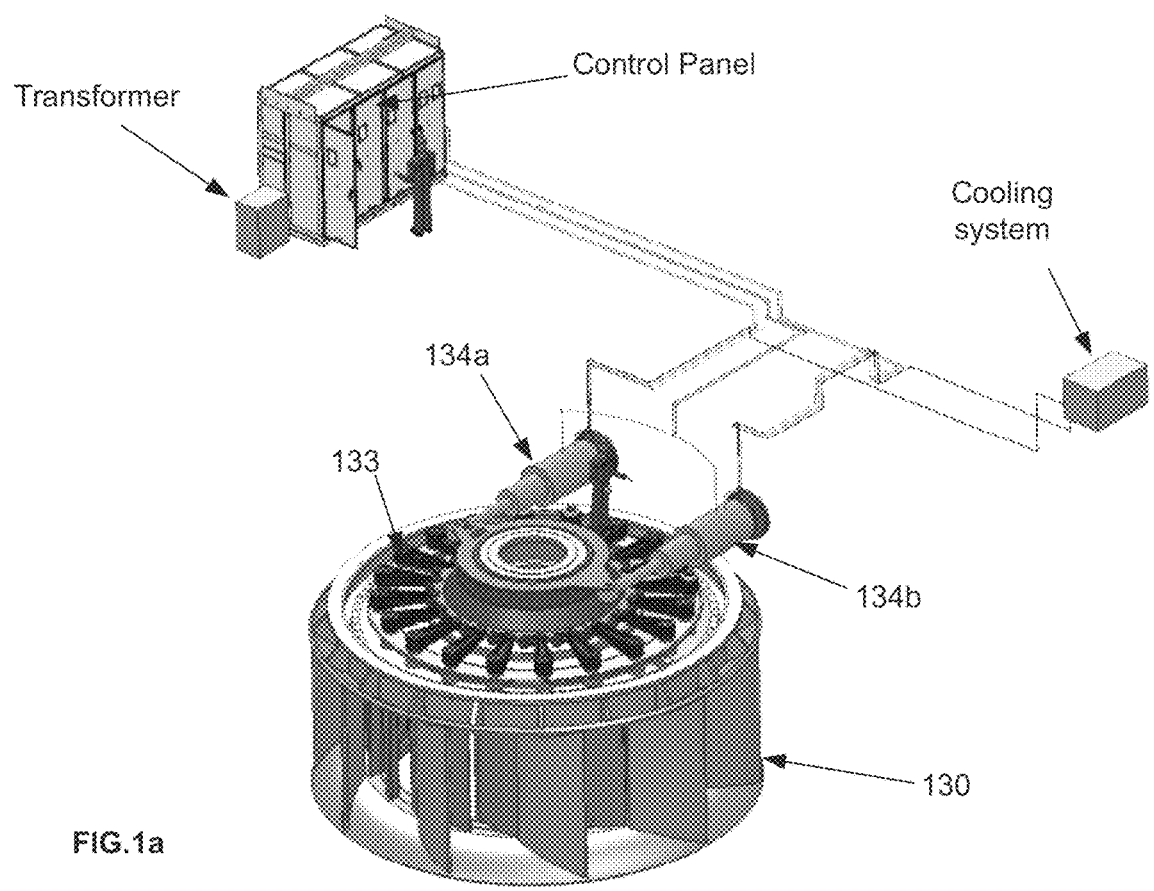
FIGS. 1a and 1b are 3D illustrations illustrating the working environment of a submersible hydro-electric production system, in accordance with an embodiment.
Figure 1B:
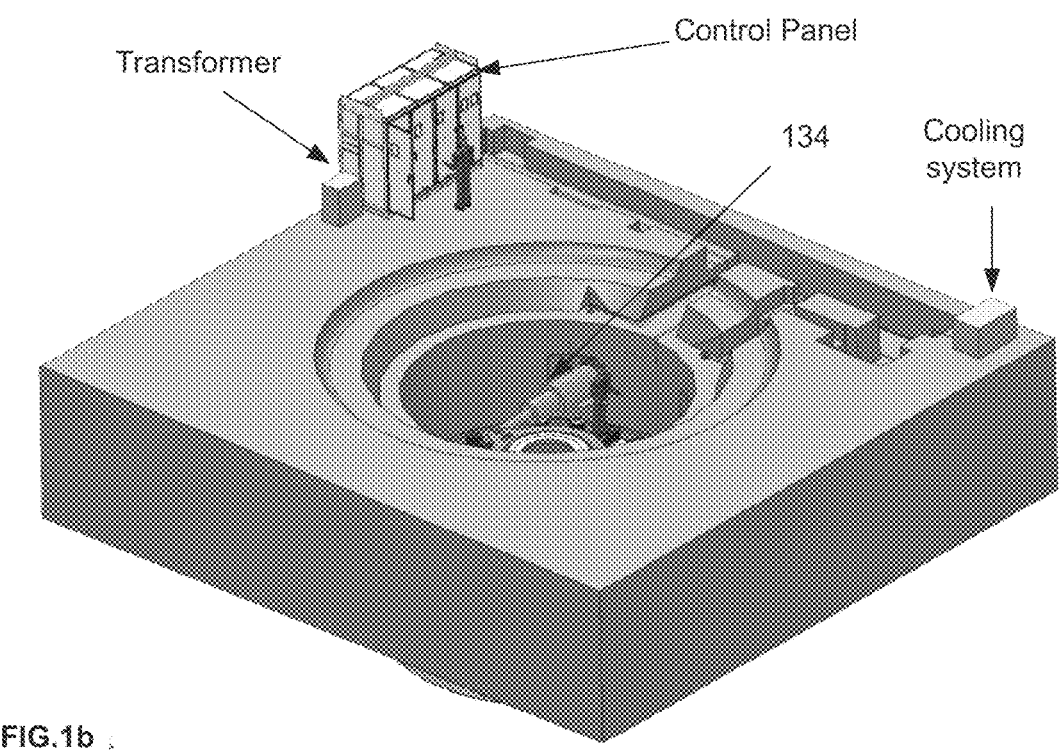

FIGS. 1a and 1b are 3D illustrations illustrating the working environment of a submersible hydro-electric production system, in accordance with an embodiment.

As shown in FIGS. 1a & 1b, the working environment may include non-submersible modules including a transformer module, an automated power feed module, a control panel module, and a cooling system. The submersible hydro-electric production system comprises a submersible turbine 130 and a submersible turbine electrical control actuator system 134. As shown in FIG. 1b, the turbine 130 may be provided in a housing structure (below the non-submersible components and modules) to control generation of power from the incoming water flowing through the turbine 130.

Figure 2:
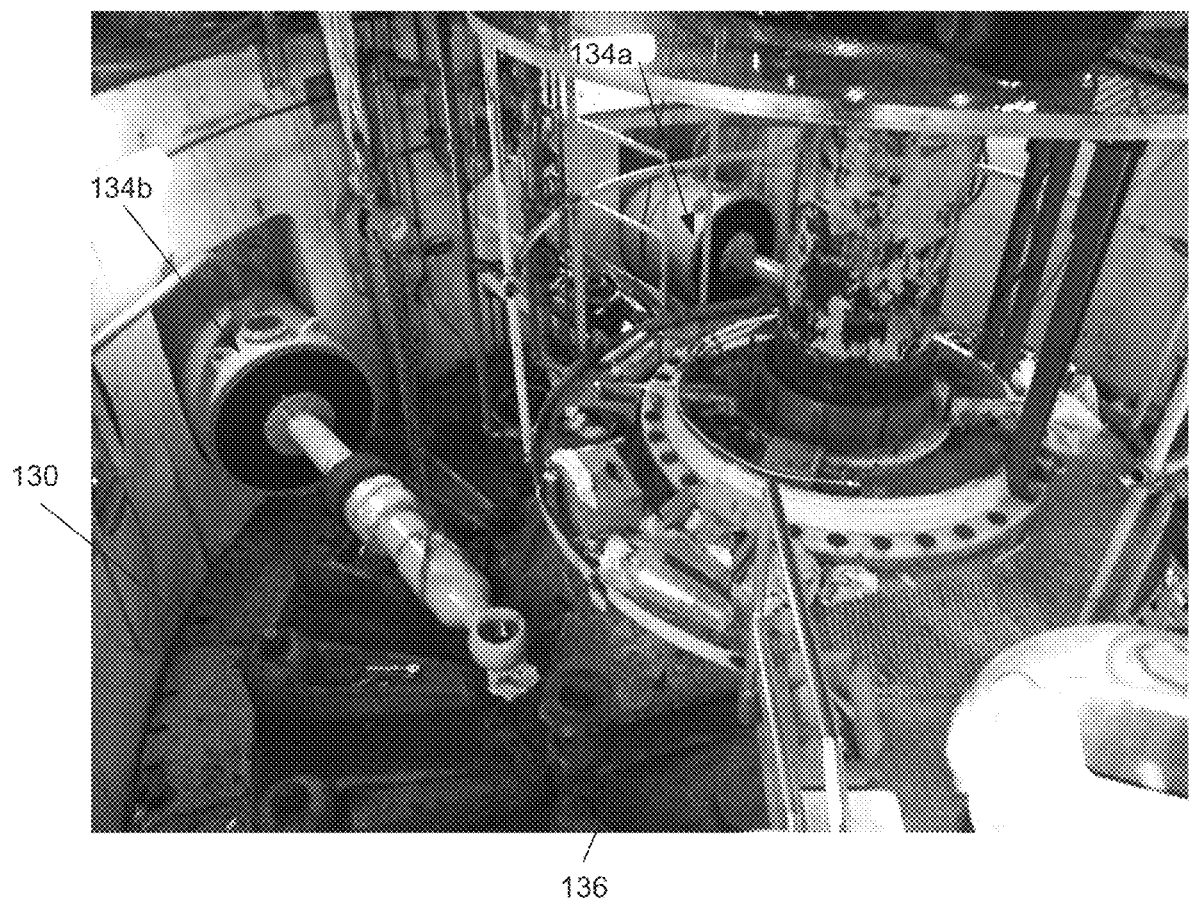
FIG. 2 is a photo which shows the actuators attached to a turbine in a real-life implementation, in accordance with an embodiment.

FIG. 2 is a photo which shows the actuators attached to a turbine in a real-life implementation. It is to be mentioned that the size of the diameter of the actuator is approximately 2-4 feet throughout its range of motion, and the diameter of the turbine is approximately 12 feet. This is for illustration purposes only, as turbines and actuators can vary in size depending on the production capacity of the hydro-electric dam.

In an embodiment, control of the actuators 134a and 134b is done using an electric drive motor control system (EDMCS) which may be provided within the control panel to ensure proper control of the two actuators 134. In an embodiment, the EDMCS (aka control interface) is used as an interface between the existing control signal sent by the central control system 140 at the plant (and which is designed for a hydraulic control environment) and the electrical actuators 134. An example is provided with reference to FIGS. 3a & 3b.

Figure 3A:
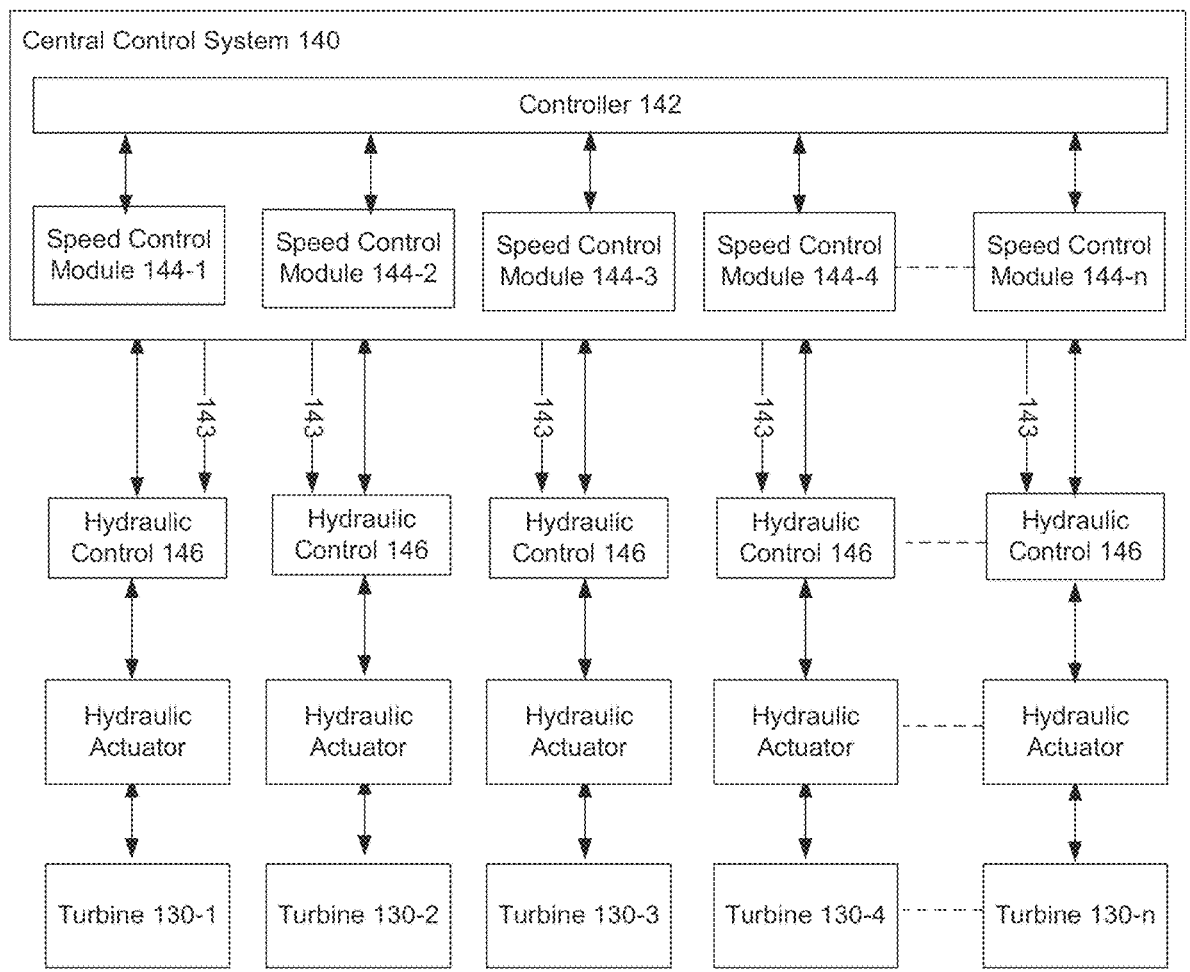
FIG. 3a illustrates the control of turbines using the conventional hydraulic systems.

FIG. 3a illustrates the control of turbines using the conventional hydraulic systems. As shown in FIG. 3a, a central control system 140 communicates with each turbine 130-1 to 130-n in the dam to control the opening and closing of the blades in the turbine for regulating the flow of water and thus the speed and electricity production of each individual turbine. A position sensor 133 (shown in FIG. 1) is provided on each turbine 130 to report the position of the blades back to the central control system 140 (the position sensor 133 is typically provided on the gate operating ring to which the blades are connected). The central control system uses the info received from the position sensor 133 to determine the speed and duration of the signal sent to the hydraulic control system.

Referring back to FIG. 3*a*, the central control system 140 comprises a central controller 142 which determines an overall amount of electricity needed based on grid demand, water level and other factors etc. as discussed above, and a speed control module 144 associated with each turbine 130 which is configured to determine the opening and closing of the associated turbine 130 in the dam based on the instructions of the associated central controller 142 e.g. causing the opening of a first turbine 130 to a full capacity and/or opening a second one at 90% capacity while closing a third one completely etc. Needless to say, the speed control module may also be configured manually for closing a given turbine for maintenance or the like. The speed control module 144 sends a control signal to each turbine 130. The control signal is a speed signal which determines the speed and movement duration of the existing hydraulic actuators.

Existing hydraulic actuators act as pistons which transform oil pressure into an axial movement in order to open/close the gate operating ring 136 to which the blades (aka wicket gates) are attached. For example, if instructions are received from the controller 142 to control production of all turbines 130 in the dam at full capacity, the speed control module 144 will determine, based on the current position of each turbine, the speed, direction of movement, and duration of movement of the hydraulic actuator in order to rotate the blades of that turbine from an existing position to a fully open position.

In typical turbines, the speed control module sends a 4-20 mA signal to each turbine in order to manage the opening and closing of that turbine. At 12 mA, the instruction for the hydraulic control system 146 is to keep the hydraulic actuators in the current position. From 12.1-14 mA, the instructions are for the first actuator (aka upstream) to push and the second actuator (aka downstream) to pull, simultaneously, in order to open the turbine. From 9-11.9 mA, the actuators should do the opposite (first actuator pulls and the second actuator pushes in order to close the turbine). Hydraulic systems often operate using a pulsing oscillation valve within hydraulic lines to overcome the static friction created within the many hydraulic signal valves in the original system. In an embodiment, less than 1 mA of oscillation is used in order to provide the necessary pulse needed to overcome the static friction. Such oscillation is needed in hydraulic systems but greatly damages & reduces the life of the gears associated with the electrical actuators 134.

The challenge of the EDMCS lies in its function as a completely retro-fitted system within an existing overall facility control system which manages multiple turbines as required based on the electrical grid loading requirements, river source water levels and other factors. In other words, the main challenge with the functionality of the EDMCS is that the behavior of the hydraulic systems is completely different than that of an electric system. Therefore, the existing control signals sent by the central control system 140 in the facility, which are intended to control hydraulic systems cannot be used to control the electric actuators 134. The EDMCS is configured to receive the existing control signal and transform it for use with an electrical actuator.

Figure 3B:
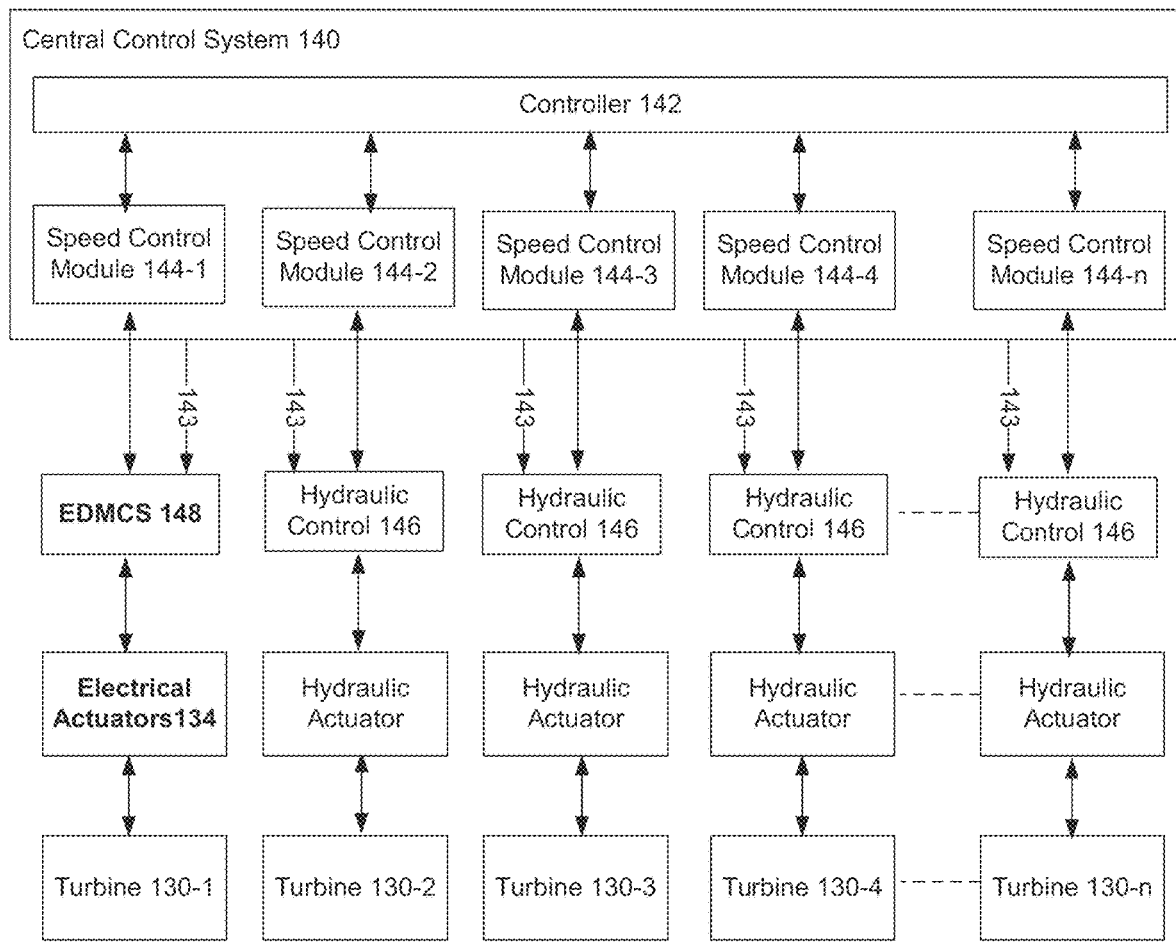
FIG. 3b illustrates the control of turbines using the electrical actuators in accordance with the present embodiments.

FIG. 3*b* illustrates the control of turbines using the electrical actuators in accordance with the present embodiments. Assuming in FIG. 3*b* that turbine 130-1 has been upgraded to use electrical actuators 134 instead of the hydraulic ones that are used to control the other turbines 130-2 to 130-*n*. As shown in FIG. 3*b*, the EDMCS 148 receives the conventional control signal that is intended for the hydraulic actuators and transforms this signal into a new signal that is intended to control the electric actuator system 134 of the turbine 130-1. An emergency line 143 may be provided between the central control station 140 and each hydraulic control unit 146 and EDMCS 148 bypassing the speed control module 144 in order to cause immediate closing of the turbine 130 in emergency situations such as malfunction of the speed control module 144 or any one of the Analog to Digital Conversion Modules 152.

Challenges

As discussed above, the main challenge of the EDMCS lies in its function as a completely retro-fitted electrical system within an existing overall facility that is designed to manage multiple turbines that are controlled using hydraulic systems, whereas the behavior of the hydraulic systems is completely different from the electrical ones.

One of the main challenges that prevent the existing control signals from being suitable for use with electrical actuators is that their sharp intensity changes cause premature failure in the gears of electrical actuators. In particular, hydraulic systems tend to have a higher initial surface tension to overcome due to the oil seal to piston interface, whereas an electric motor's maximum torque occurs at speed=0 RPM (for permanent magnet motors such as the one used in this configuration). Likewise, the natural cushioning effect of the compressed oil in the hydraulic system dampens the jarring effect of the actuator when it stops or starts moving, whereas the electric version has no such dampening benefit. Due to the tolerance in the screw threads in the actuator on the electric motor system, acceleration and deceleration of the actuator as instructed by the facility's speed sensor would cause clicking and jerking, and thus, premature wear in the gearing leading to maintenance issues which would necessitate increased replacement frequency of the screw thread caused by the jerking effect at start and stop of the actuator. An example is illustrated with respect to FIGS. 4*a* and 4*b*.

Figure 4A:
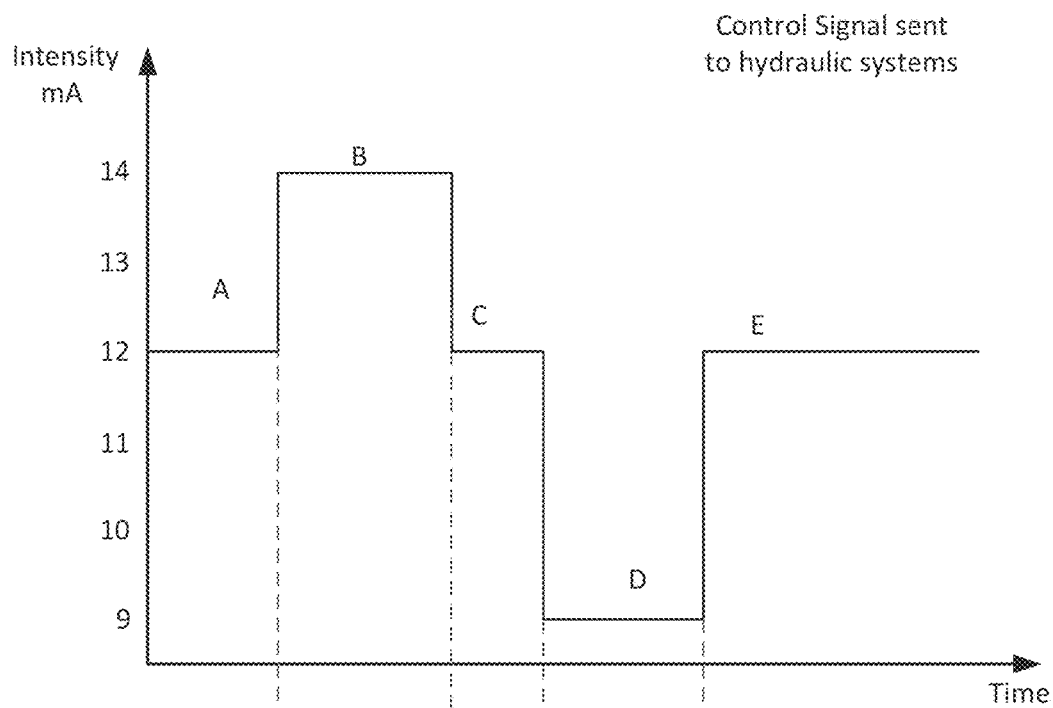
FIG. 4a illustrates an example of a speed control signal sent to a hydraulic control system to control operation of a given turbine.

FIG. 4*a* illustrates an example of the speed control signal sent to a hydraulic control system to control operation of the associated turbine. As shown in FIG. 4, in zone A the intensity is at 12 mA to maintain the current position. At zone B the intensity has increased from 12 mA to 14 mA in order to open the turbine, then in zone C the instructions are to maintain the current position. In zone D, the instructions are to close the turbine and the intensity dropped from 12 mA to 9 mA causing a sudden closing of the turbine. Such sharp intensity changes are acceptable in hydraulic systems 146. In fact they are needed especially to start the movement and to overcome static friction and they may even go higher to overcome static friction. However, electric motors have a maximum torque at zero RPM and the sudden change of intensity will cause jerking on the gears and will reduce their durability.

In order to control the electrical actuators and at the same time reduce the jerking effect on the gears due to the sudden change in intensity of the existing speed control signal, the EDMCS 148 is configured to transform the speed control signal received from the speed control module 144 into a new control signal which is suitable for electrical actuators 134 and to introduce a dampening effect at each change of speed (and intensity) that is demanded from the electrical actuators in order to avoid/reduce jerking on the gears.

Figure 4B:
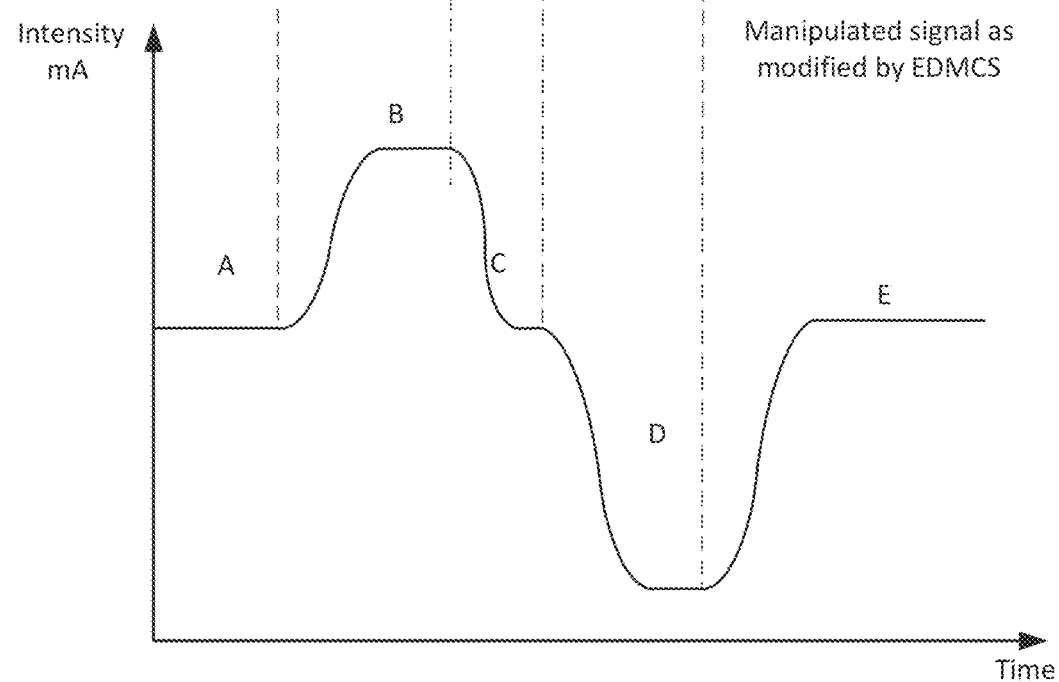
FIG. 4b illustrates an example of a speed control signal output by the EDMCS to the electrical actuators in response to the speed signal shown in FIG. 4a which was intended for a hydraulic system.

FIG. 4*b* illustrates an example of a speed control signal output by the EDMCS to the electrical actuators in response to the speed signal shown in FIG. 4a which was intended for a hydraulic system. As shown in FIG. 4b, the control signal sent to the electrical actuators includes dampening zones which gradually introduce the movement onto the electrical actuators. For example, the transitions between zones A and B is sudden in FIG. 4a in order to overcome static friction in the hydraulic system. By contrast, the corresponding zone in FIG. 4a starts with a low intensity which increases gradually in order to reduce the torque and smoothly introduce the motion onto the gears to avoid clicking and jerking which is mainly caused by the sudden movement at high torque and the tolerance in the gears.

The same applies to the stopping movement between zones B and C whereby the intensity decreases from full speed to full stop immediately in hydraulic systems. The elasticity in the seal and joints reduce the shock in the hydraulic systems. However, in order for the stop not to affect the gears in the electric actuators, the EDMCS 148 gradually reduces the intensity of the speed control signal in order to reduce the jerking and clicking effect on the gears.

The other challenge that the EDMCS deals with is the fact that existing hydraulic systems receive one control signal which is translated into a hydraulic pressure in a hydraulic reservoir permitting the two hydraulic actuators to move concurrently without the need for a separate control system for each actuator. These hydraulic actuators act as pistons which transform oil pressure into an axial movement in order to open/close the gate operating ring to which the blades are attached, whereby, the positive pressure applied to one piston is the same as the negative pressure applied to the other piston causing simultaneous and opposite movements of the hydraulic actuators.

This is not the case with electrical actuators such as those described in co-invented and co-owned International Patent Application No. PCT/CA2015/000253. These actuators need to be separately controlled in order to ensure proper movement. Also a sophisticated system failure mechanism need to be implemented in order to take the necessary measures in the case of failure in one or more of the components, in order to avoid further damage of surrounding mechanical and electrical components of the hydroelectric production system.

Figure 5:
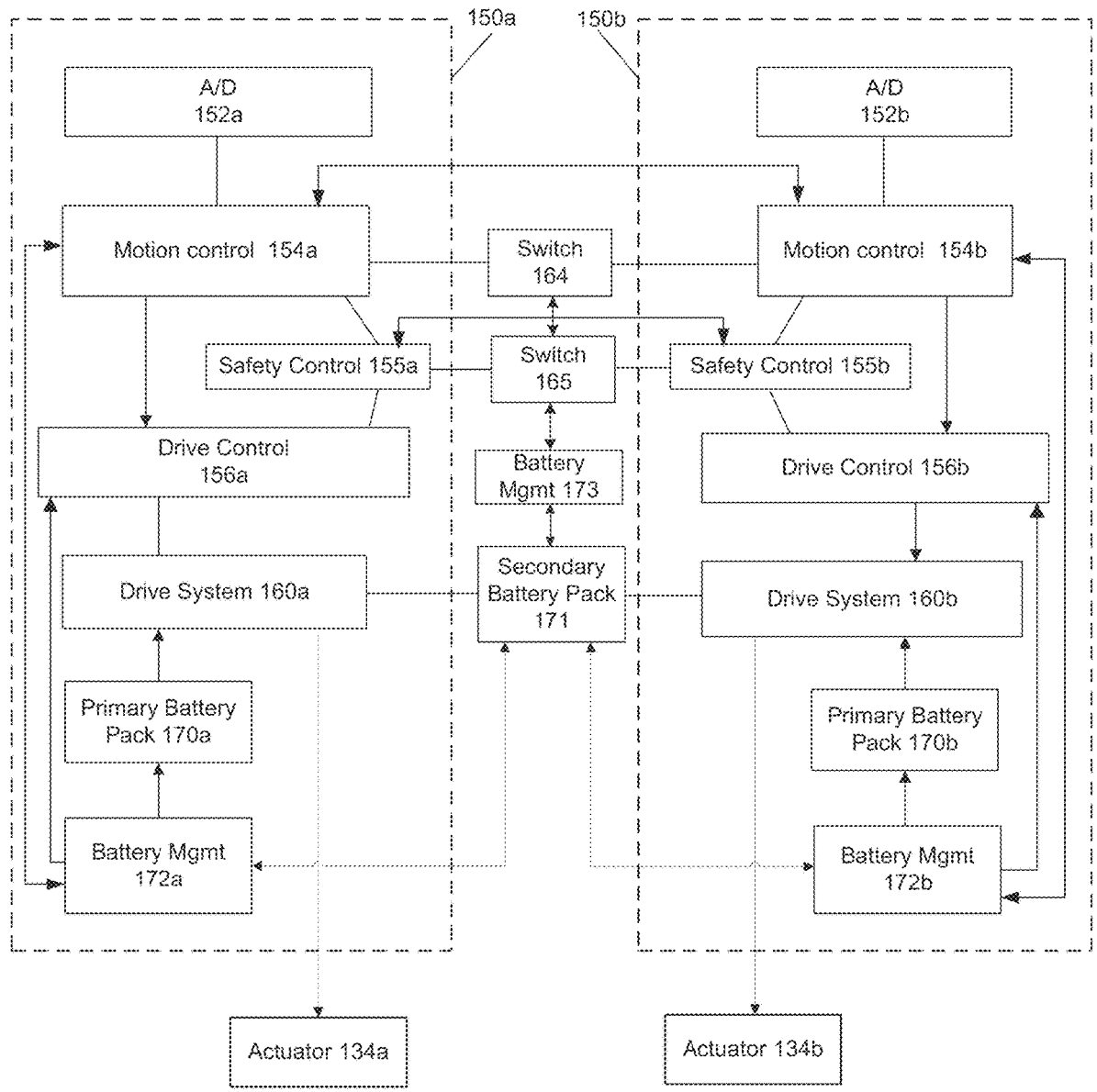
FIG. 5 illustrates an exemplary block diagram of an EDMCS in accordance with an embodiment.
Figure 5A:
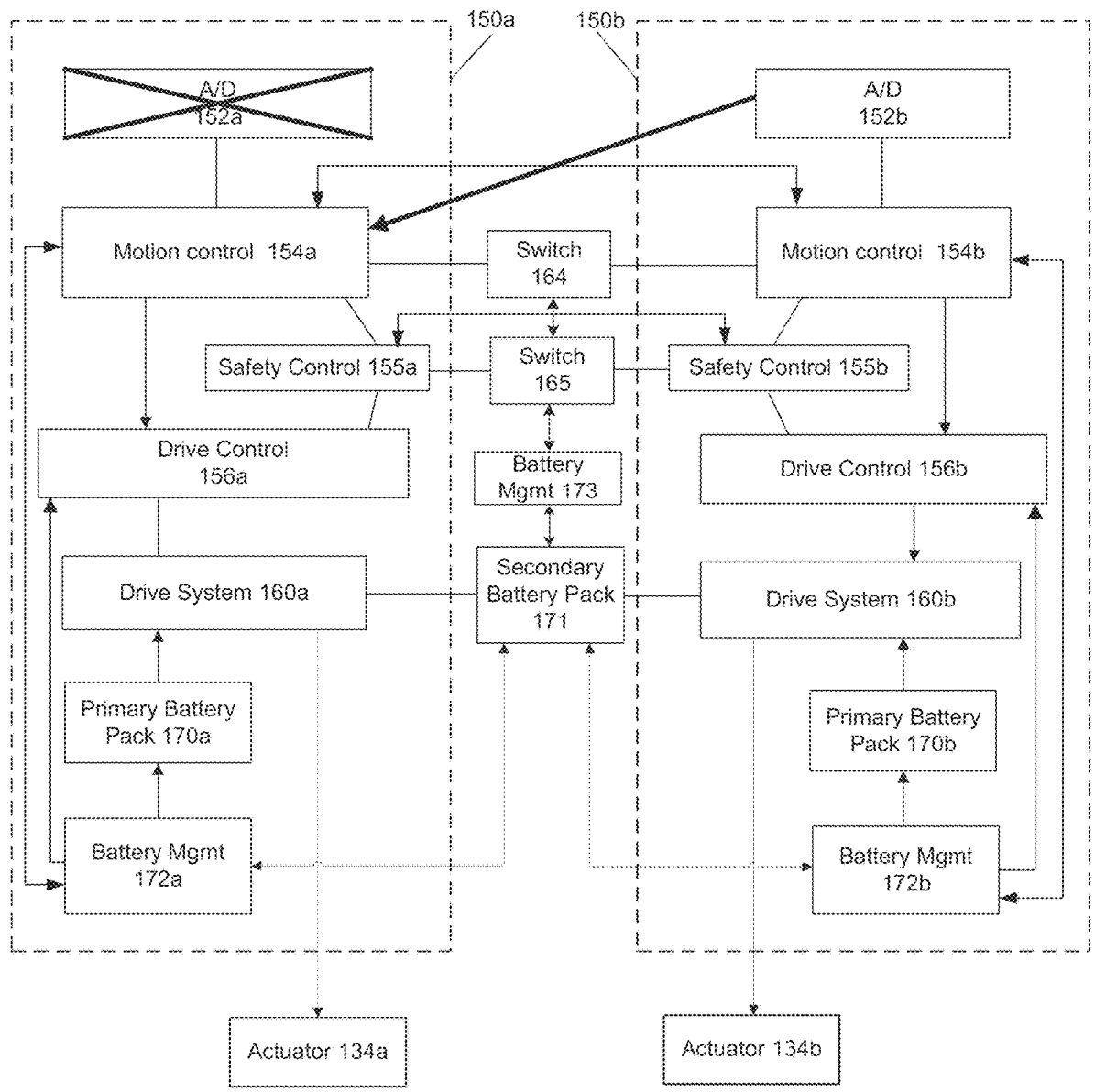
FIG. 5a illustrates an exemplary configuration of a failure mechanism when the A/D of one of the units fails.

FIG. 5 illustrates an exemplary block diagram of an EDMCS in accordance with an embodiment, and FIG. 5a illustrates an exemplary configuration of a failure mechanism when the A/D of one of the units fails. FIG. 6a is a front perspective view of a EDMCS in accordance with an embodiment; and FIG. 6b is a rear view of the EDMCS of FIG. 6a.

As shown in FIGS. 5 the EDMCS includes two control units 150, a first control unit 150a associated with the first actuator 134a (aka upstream actuator) and a second control unit 150b associated with the second actuator 134b (aka downstream actuator). The instructions provided to both units 150a and 150b are exactly the same and so is the output provided by each of these units 150 with the exception of the reversal of the electric field in the drive system of one of the actuators to cause the motors to rotate in opposite directions. This is important because the actuators 134 need to operate at the same speed but in different directions in order to open and close the gate operating ring. Accordingly, to avoid repetition, the operation of only one of these units 150 will be provided herein.

Referring back to FIG. 5, each control unit 150 includes an A/D converter 152 configured to receive the square control signal exemplified in FIG. 4a which is intended for the hydraulic actuator and transform that signal into a digital format. The A/D converter 152a converts the analog speed sensor signal (4-20 mA) into a digital format for processing in the Motion Control module 154a. The digital version of the signal is received at the motion control module 154. The motion control module 154a represents the processor which, based on the inputs from the plant's speed sensor, decides whether to turn the actuator in a clockwise or counterclockwise manner and the duration of rotation, in order to rotate the wicket gates in a fashion that imitates the hydraulic actuators.

In other words, the electric actuator system should respond to the hydraulic control signal in substantially the same manner as the hydraulic actuator system, to avoid any change in the central control station. The motion control module 154 is the intelligence module which controls the motion of the associated actuator 134. The motion control module 154a is configured to process the received signal and dampen the signal as exemplified in FIG. 4b in order to reduce jerking on the gears and reduce sharp edges which cause sudden acceleration and/or deceleration which damage the gears associated with the actuators. The control unit 150a includes a drive control module 156a and a drive system 160a. The drive control module 156a acts as an interface which translates the signal output of the motion control into a signal that the drive system can understand. The drive system 160a is a module that comes with the electric motor and includes an internal power amplifier which permits sufficient current draw to operate the motor in the manner required by the motion control 154a.

In an embodiment, each control unit 150 may likewise comprise a dedicated security control system 155a whose function is to manage all of the safety overrides which may occur due to extraordinary operation of the turbine actuators. When required, the security control system 155 overrides the Motion Control Module 154 and sends a safety signal (for example, limiting the speed of the actuator or auto close under required safety protocol) to the Drive Control 156 (through the Motion Control Module 154) which must override the signal of the Motion Control Module 154, and act as instructed by the safety control module 155. This safety control system 155 operates with a switch 165 similar to the redundant management system 164 in case of failure of one of the communication links between the modules.

The functions of the control unit 150b are exactly the same with the exception that the drive control and drive control system 156b cause rotation of the actuator 134b in an opposite direction to the actuator 134a.

As shown in FIG. 5, a switch 164 is provided between the two control units 150a and 150b. In an embodiment, the switch 164 operates a redundancy ring which pings the different modules in the control units to ensure proper functioning and to intervene in cases of malfunction of the communication ring. For example, if the A/D 152a ceases to work the switch would provide the motion control 154a with the output of the A/D 154b as exemplified in FIG. 5a.

An alert/warning may be sent to the operator to alert them without causing a shutdown of the turbine.

However, in the case of any malfunction in the drive control 156a or the drive system 160a, the switch 164 will activate an electric break on the motor 134a (not shown) causing the motor 134a to freewheel. In this case, the actuator 134b will operate in the normal mode causing closure of the entire turbine in an automatic mechanical way (whereby when one motor functions and the other does not closure will occur automatically). An alarm is sent to the central control station 140 to alert the operator of the situation.

A Primary Battery Pack 170a and 170b is provided for each of the Control Units 150a and 150b which provides sufficient energy to the actuators to act in emergency situations. In a non-limiting example of implementation, each battery pack is configured to power the associated actuator to perform at least 3 open/close cycles in the event of power loss in the facility. A Secondary Back-Up battery pack 171 may be provided in the event that one of the Primary Battery Packs fails. Battery Management Systems 172a and 172b may be provided, in an embodiment, to ensure that any faults in the Primary Battery Packs are detected and that the energy requirement in the event of facility power loss comes from either the operational Primary Battery Pack or the Secondary Back-Up Battery Pack. In an embodiment, the Secondary Back-Up Battery Pack 171 may be configured to include its own Battery Management System 173 to likewise ensure that any fault in the Secondary Back-up Battery Pack is detected.

Figure 7:
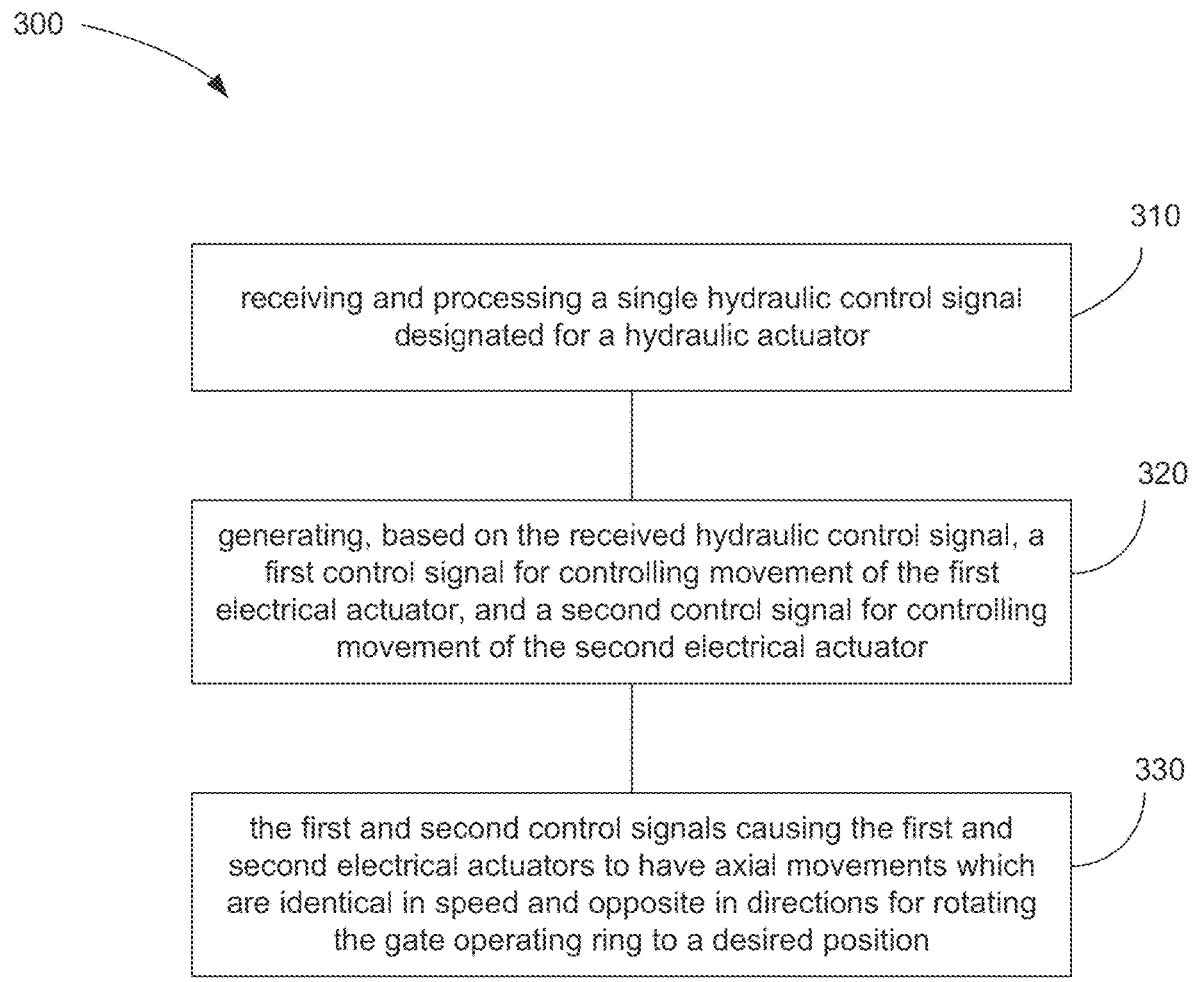
FIG. 7 is flowchart of a method for retrofitting an electrical actuator system of a hydro-electric turbine in a hydraulic control environment.

FIG. 7 is flowchart of a method 300 for retrofitting an electrical actuator system of a hydro-electric turbine in a hydraulic control environment. The electrical actuator system comprising a first and a second electrical actuators operably connected at opposite positions to a gate operating ring. The method begins at step 310 by receiving and processing a single hydraulic control signal designated for a hydraulic actuator. At step 320 the method comprises generating, based on the received hydraulic control signal, a first control signal for controlling movement of the first electrical actuator, and a second control signal for controlling movement of the second electrical actuator. At step 330 the first and second control signals cause the first and second electrical actuators to have axial movements which are identical in speed and opposite in directions for rotating the gate operating ring to a desired position.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for controlling operation of an electrical actuator system of a hydro-electric turbine in a hydraulic control environment in which control signals are generated for hydraulic actuators, the electrical actuator system comprising a first electrical actuator and a second electrical actuator operably connected at opposite positions to a gate operating ring, the system comprising:
a control interface configured to receive a hydraulic control signal and process the hydraulic control signal to generate a first control signal for controlling movement of the first electrical actuator, and a second control signal for controlling movement of the second electrical actuator;
wherein the first and second control signals cause the first and second electrical actuators to have axial movements which are identical in speed and opposite in directions for rotating the gate operating ring to a desired position, thereby, imitating movement of the hydraulic actuators.

2. The system of claim 1, wherein the control interface is configured to introduce a dampening effect onto the first and second control signals to reduce an effect of sharp intensity changes of the hydraulic control signal onto gears of the electrical actuators.

3. The system of claim 1, wherein the control interface comprises a first control unit dedicated to the first electrical actuator and a second control unit dedicated to the second electrical actuators, the first and second control units being substantially identical and being adapted receive the same hydraulic control signal to produce the first and second control signals, respectively.

4. The system of claim 3, further comprising a first switch operably connected between the first control unit and the second control unit, the first switch being adapted to ping components of the first and second control units to override an output of a dysfunctional component of a first control unit from a respective component in the second control unit to ensure proper operation of the electrical actuators when a given component fails.

5. The system of claim 3, wherein each control unit comprises:
a motion control module adapted to determine, based on the hydraulic control signal, a direction and/or duration of rotation of a respective one of the first and second electrical actuators, and to output the direction and/or the duration of rotation as determined;
a drive control module adapted to transform an output of the motion control module to an electrical signal that is compatible with a drive system associated with the respective electrical actuator.

6. The system of claim 5 wherein each control unit comprises a safety control module adapted to override both the motion control module and the drive control module to send an emergency signal to the drive system in case of emergencies.

7. The system of claim 6, further comprising a second switch operably connected between the safety control modules of the first and second control units, the second switch being adapted to ping the safety control modules to override an output of a dysfunctional safety control module of the first control unit with the output of a functional safety control module from the second control unit.

8. The system of claim 5, further comprising:
a primary battery backup dedicated to each control unit;
a secondary battery backup configured to back up at least one of the primary battery backups, and
a battery management module operably connected between the primary battery backup of each control unit and the secondary battery backup for managing provision of electrical power to each control unit in case of emergencies.

9. A method for retrofitting an electrical actuator system of a hydro-electric turbine in a hydraulic control environment, the electrical actuator system comprising a first electrical actuator and a second electrical actuator operably connected at opposite positions to a gate operating ring, the method comprising:
receiving and processing a single hydraulic control signal designated for a hydraulic actuator;
generating, based on the received hydraulic control signal, a first control signal for controlling movement of the first electrical actuator, and a second control signal for controlling movement of the second electrical actuator;
the first and second control signals causing the first and second electrical actuators to have axial movements which are identical in speed and opposite in directions for rotating the gate operating ring to a desired position.

10. The method of claim 9, further comprising introduce a dampening effect onto the first and second control signals to reduce an effect of sharp intensity changes of the hydraulic control signal onto gears of the electrical actuators.

11. The method of claim 9, further comprising controlling each electrical actuator using a dedicated control unit, wherein a first control unit generates the first control signal and a second control unit generates the second control signal.

12. The method of claim 11, further comprising providing a first redundancy switch between the first control unit and the second control unit for overriding an output of a dysfunctional component in one of the control units with an output of a corresponding component in the other control unit.

13. The method of claim 11, further comprising providing, in each control unit, a safety control module adapted to override a respective control signal sent to a respective actuator for forcing an opening/closing of the turbine in an emergency situation.

14. The method of claim 13, further comprising providing a second redundancy switch between the safety control module of the first control units and the safety control module of the second control unit for overriding an output of a dysfunctional safety control module in one of the control units with an output of the other safety control module in the other control unit.

15. The method of claim 11, further comprising providing a
   a primary battery backup dedicated to each control unit;
   a secondary battery backup configured to back up at least one of the primary battery backups, and
   a battery management module operably connected between the primary battery backup of each control unit and the secondary battery backup for managing provision of electrical power to each control unit in case of emergencies.

16. A system for retrofitting an electrical actuator system of a hydro-electric turbine in a hydraulic control environment, the system comprising:
   a control interface configured to receive a hydraulic control signal generated for hydraulic actuators and process the hydraulic control signal to generate a first control signal for controlling movement of a first electrical actuator, and a second control signal for controlling movement of a second electrical actuator; the first and second electrical actuators being operably connected at opposite positions to a gate operating ring which is connected to rotating wicket gates of the turbine;
   the first and second control signals causing the first and second electrical actuators to have axial movements which are identical in speed and opposite in directions for rotating the gate operating ring to a desired position, thereby, substantially imitating an exact movement of the hydraulic actuators in response to the hydraulic control signal.

17. The system of claim 16, wherein the control interface is configured to introduce a dampening effect onto the first and second control signals to reduce an effect of sharp intensity changes of the hydraulic control signal onto gears of the electrical actuators.

18. The system of claim 16, wherein the control interface comprises a first control unit dedicated to the first electrical actuator and a second control unit dedicated to the second electrical actuators, the first and second electrical units being substantially identical and being adapted receive the same hydraulic control signal to produce the first and second control signals, respectively.

19. The system of claim 18, further comprising a redundancy switch between the first control unit and the second control unit for overriding an output of a dysfunctional component in one of the control units with an output of a corresponding component in the other control unit.

20. The system of claim 18, further comprising
   a primary battery backup dedicated to each control unit;
   a secondary battery backup configured to back up at least one of the primary battery backups, and
   a battery management module operably connected between the primary battery backup of each control unit and the secondary battery backup for managing provision of electrical power to each control unit in case of emergencies.

* * * * *